United States Patent [19]
Marshall

[11] 3,931,593
[45] Jan. 6, 1976

[54] LASER BEAM CONTROL DEVICE
[75] Inventor: H. Laurance Marshall, Palo Alto, Calif.
[73] Assignee: GTE Sylvania Incorporated, Mountain View, Calif.
[22] Filed: Apr. 22, 1974
[21] Appl. No.: 462,738

[52] U.S. Cl. ............................. 331/94.5 D; 350/285
[51] Int. Cl.² ........................................ H01S 3/02
[58] Field of Search ........... 331/94.5; 350/266, 275, 350/285

[56] References Cited
UNITED STATES PATENTS
3,392,258  7/1968  Bruma et al. .......... 331/94.5; DIG.1
3,416,089  12/1968  Koester et al. ................. 331/94.5 C

*Primary Examiner*—William L. Sikes
*Attorney, Agent, or Firm*—John F. Lawler; Norman J. O'Malley; Elmer J. Nealon

[57] ABSTRACT

A shutter and beam expander for diverting the output of a high power laser into an absorption body comprises a onepiece metallic structure having a convex spherically shaped portion adapted to be moved into the beam path for simultaneously reflecting and expanding the beam into energy absorption material.

1 Claim, 3 Drawing Figures

LASER BEAM CONTROL DEVICE

BACKGROUND OF THE INVENTION

This invention relates to an improved shutter controlling the beam of a high power laser.

When the output beam of a high power continuously operating laser is temporarily switched off or interrupted in the normal operation of associated apparatus or systems, dissipation of energy during the interruption period presents a problem simply because of the extremely high power densities involved. For example, the Nd:YAG type laser on which this device was first used produces a 6 mm diameter beam having a power density of up to 4.4 killowatts per square centimeter. Prior art practice has been to move a reflector into the beam path and reflect the beam through a fixed optical expander lens into an appropriate absorber such as oxidized aluminum. The expander lens effectively reduces the power density in the beam to a level that may be dissipated safely and without damage to the absorber. The expander lens is not only an expensive component but also tends to collect dust particles which interfere with the dissipation function. Furthermore, mounting and alignment of the lens between the reflector and absorber is an additional cost factor in the construction of the associated apparatus.

SUMMARY OF THE INVENTION

A general object of this invention is the provision of a simplified low cost beam reflector and expander for a high power laser.

This and other objects are achieved with a reflector and expander which are combined into a unitary structure in which the reflecting surface is spherically contoured.

DESCRIPTION OF PREFERRED EMBODIMENT

Figure 1:
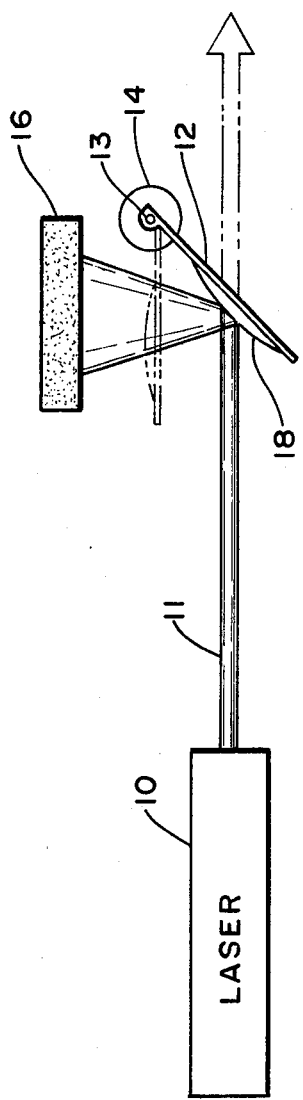
FIG. 1 is a schematic diagram of a laser system employing a shutter plate embodying this invention.
Figure 3:
FIG. 3 is a section taken on line 3—3 of FIG. 2.
Figure 2:
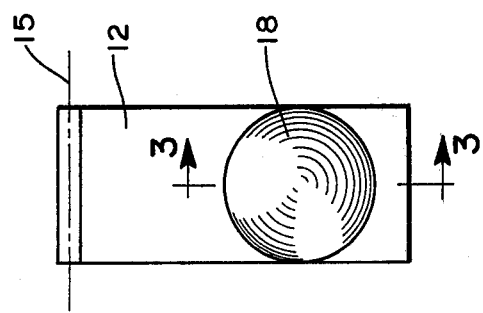
FIG. 2 is a plan view of the shutter plate shown in FIG. 1.

Referring to the drawings, a high power laser 10 produces an output beam 11 which is directed as indicated by the arrow toward a utilization apparatus or item, not shown. In order to interrupt the beam 11 as may be required in the operation of the utilization apparatus, a reflecting shutter 12 supported on the shaft 13 of a rotary solenoid 14 is selectively rotated about the shaft axis 15 by energization of the solenoid between an operative position in the beam path as shown in solid lines and the inoperative position out of the beam path as shown in broken lines. In the beam blocking position, shutter 12 extends across the incident beam at an obtuse angle with respect to the beam axis so as to reflect the beam out of its initial path into a pad 16 of energy absorbing material such as oxidized aluminum.

Shutter 12 preferably comprises an opaque plate of a readily shapable reflecting material such as thin aluminum sheet having a convexospherical surface 18 on the side of incidence of the laser beam. Spherically shaped surface 18 performs two functions: (1) it reflects the laser beam and (2) simultaneously expands the beam as indicated at 11a for dissipating the energy over a relatively wide area of absorber 16. Thus the need for a separate expanding lens is eliminated without the loss of its function.

What is claimed is:
1. In combination
    a high power laser having an output beam directed along an axis,
    an opaque shutter extending across the beam path at an obtuse angle with respect to the incident beam to define an operative reflecting position and movable to an inoperative position out of the beam path,
    said shutter having a convexospherical surface at the point of incidence of said beam when the shutter is in the operative position whereby to reflect and expand said beam,
    energy absorber means in the path of said reflected beam, and
    means selectively to rotate said shutter between said operative and inoperative positions.

* * * * *